United States Patent
Matsumura

(10) Patent No.: US 10,343,194 B2
(45) Date of Patent: Jul. 9, 2019

(54) TIRE CLEANING SYSTEM

(71) Applicant: The Yokohama Rubber Co., LTD., Minato-ku, Tokyo (JP)

(72) Inventor: Kensuke Matsumura, Shinshiro (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 15/775,648

(22) PCT Filed: Nov. 4, 2016

(86) PCT No.: PCT/JP2016/082778
§ 371 (c)(1),
(2) Date: May 11, 2018

(87) PCT Pub. No.: WO2017/082162
PCT Pub. Date: May 18, 2017

(65) Prior Publication Data
US 2018/0318888 A1    Nov. 8, 2018

(30) Foreign Application Priority Data
Nov. 11, 2015   (JP) .................. 2015-221378

(51) Int. Cl.
| | | |
|---|---|---|
| *B08B 7/00* | (2006.01) | |
| *B29D 30/00* | (2006.01) | |
| *B23K 26/08* | (2014.01) | |
| *B23K 26/362* | (2014.01) | |
| *B29D 30/06* | (2006.01) | |

(Continued)

(52) U.S. Cl.
CPC .............. *B08B 7/0042* (2013.01); *B08B 7/00* (2013.01); *B23K 26/0823* (2013.01); *B23K 26/362* (2013.01); *B29D 30/00* (2013.01); *B29D 30/0681* (2013.01); *B08B 2209/00* (2013.01); *G06T 7/001* (2013.01); *G06T 7/90* (2017.01); *G06T 2207/10024* (2013.01)

(58) Field of Classification Search
CPC ................................................... B08B 7/0042
See application file for complete search history.

(56) References Cited

U.S. PATENT DOCUMENTS

| | | |
|---|---|---|
| 5,928,533 A | 7/1999 | Pirelli |
| 6,113,707 A | 9/2000 | Pirelli |
| (Continued) | | |

FOREIGN PATENT DOCUMENTS

| | | |
|---|---|---|
| EP | 1 604 809 | 12/2005 |
| JP | H09-327832 | 12/1997 |
| (Continued) | | |

OTHER PUBLICATIONS

International Search Report for International Application No. PCT/JP2016/082778 dated Jan. 31, 2017, 4 pages, Japan.

*Primary Examiner* — Jason Y Ko

(74) *Attorney, Agent, or Firm* — Thorpe North & Western

(57) ABSTRACT

With a tire cleaning system, movement of at least a tire or laser head held on an arm is controlled by a control device, a laser beam provided from a laser oscillator is irradiated onto an inner surface of the tire while relatively moving the laser head along the inner surface of the tire, and contamination such as a mold release agent or the like adhered to the inner surface is removed.

14 Claims, 4 Drawing Sheets

(51) Int. Cl.
  *G06T 7/90*    (2017.01)
  *G06T 7/00*    (2017.01)

(56) References Cited

U.S. PATENT DOCUMENTS

| | | | | |
|---|---|---|---|---|
| 6,369,353 B1 * | 4/2002 | Soska | ................... | B08B 7/0042 |
| | | | | 219/121.68 |
| 2005/0274448 A1 | 12/2005 | Lettieri et al. | | |
| 2011/0034108 A1 * | 2/2011 | Poling, Sr. | ................ | B24B 1/00 |
| | | | | 451/5 |
| 2015/0306707 A1 * | 10/2015 | Nicholson | .......... | B29D 30/0061 |
| | | | | 700/110 |
| 2017/0080608 A1 | 3/2017 | Nakamura | | |

FOREIGN PATENT DOCUMENTS

| | | |
|---|---|---|
| JP | 2000-237701 | 9/2000 |
| JP | 2001-293729 | 10/2001 |
| JP | 2002-503551 | 2/2002 |
| JP | 2002-225041 | 8/2002 |
| JP | 2004-018239 | 1/2004 |
| JP | 2005-161150 | 6/2005 |
| JP | 2005-178025 | 7/2005 |
| JP | 2015-214065 | 12/2015 |
| WO | WO 1999/42228 | 8/1999 |
| WO | WO 2015/170575 | 11/2015 |

\* cited by examiner

TIRE CLEANING SYSTEM

TECHNICAL FIELD

The present technology relates to a tire cleaning system, and particularly relates to a tire cleaning system that can efficiently remove a mold release agent or the like adhered to a tire inner surface, and can suppress the time required for cleaning in a secondary process.

BACKGROUND ART

In a manufacturing process of a tire, a mold release agent is used with the objective of easily peeling a vulcanized tire from a vulcanization bladder or the like. Therefore, the mold release agent adheres to a tire inner surface.

In recent years, in order to reduce tire running noise, a tire installed with a sound absorbing material on the tire inner surface has been developed. When attempting to bond the sound absorbing material or other attachment to the tire inner surface by an adhesive or the like, there are problems where the material cannot be bonded or firmly bonded when a mold release agent or the like is adhered to the tire inner surface.

In the related art, in order to remove the mold release agent adhered to the tire inner surface, a method of high-temperature, high-pressure cleaning water has been proposed (refer to Japanese Patent Publication No. 2000-237701). However, when the tire inner surface is cleaned using water, there is a problem where the sound absorbing material or other attachment cannot be bonded to the tire inner surface until the water is dried. In particular, the tire inner surface is a site that is difficult to discharge water to the outside, and therefore, the time required until dry increases. In other words, with this method, the time required for cleaning in a secondary process increases, which is disadvantageous for improving the productivity of a tire with an attachment bonded to a tire inner surface. Furthermore, when a device that discharges water from the tire inner surface to the outside is provided, there is a problem that the equipment is large.

SUMMARY

The present technology provides a tire cleaning system that can efficiently remove a mold release agent or the like adhered to a tire inner surface, and that can suppress the time required for cleaning in a secondary process.

A tire cleaning system of the present technology includes: a laser oscillator; a laser head that irradiates a laser beam provided from the laser oscillator onto a tire inner surface; an arm that holds the laser head; and a control device that controls movement of at least the tire or laser head, and changes the relative position of the tire and laser head; wherein the laser beam is irradiated and the tire inner surface is cleaned while relatively moving the laser head along the tire inner surface.

With the present technology, a laser beam is irradiated and a tire inner surface is cleaned while relatively moving a laser head along the inner surface by a control device, and therefore, contamination such as a mold release agent adhered to the inner surface can be efficiently removed without manual work, even with tires of various specifications (shape, size). Furthermore, a laser beam is used for removing contamination, and therefore, a secondary process such as drying water or the like is not required as with a known cleaning method using water. In other words, with the present technology, time required for cleaning in a secondary process is essentially not required, and a sound absorbing material or other attachment can be bonded to the tire inner surface even immediately after cleaning. Therefore, the present technology is advantageous in improving the productivity of a tire with an attachment bonded to an inner surface. Furthermore, a device that discharges water from the tire inner surface to the outside is not required.

DETAILED DESCRIPTION

Figure 1:
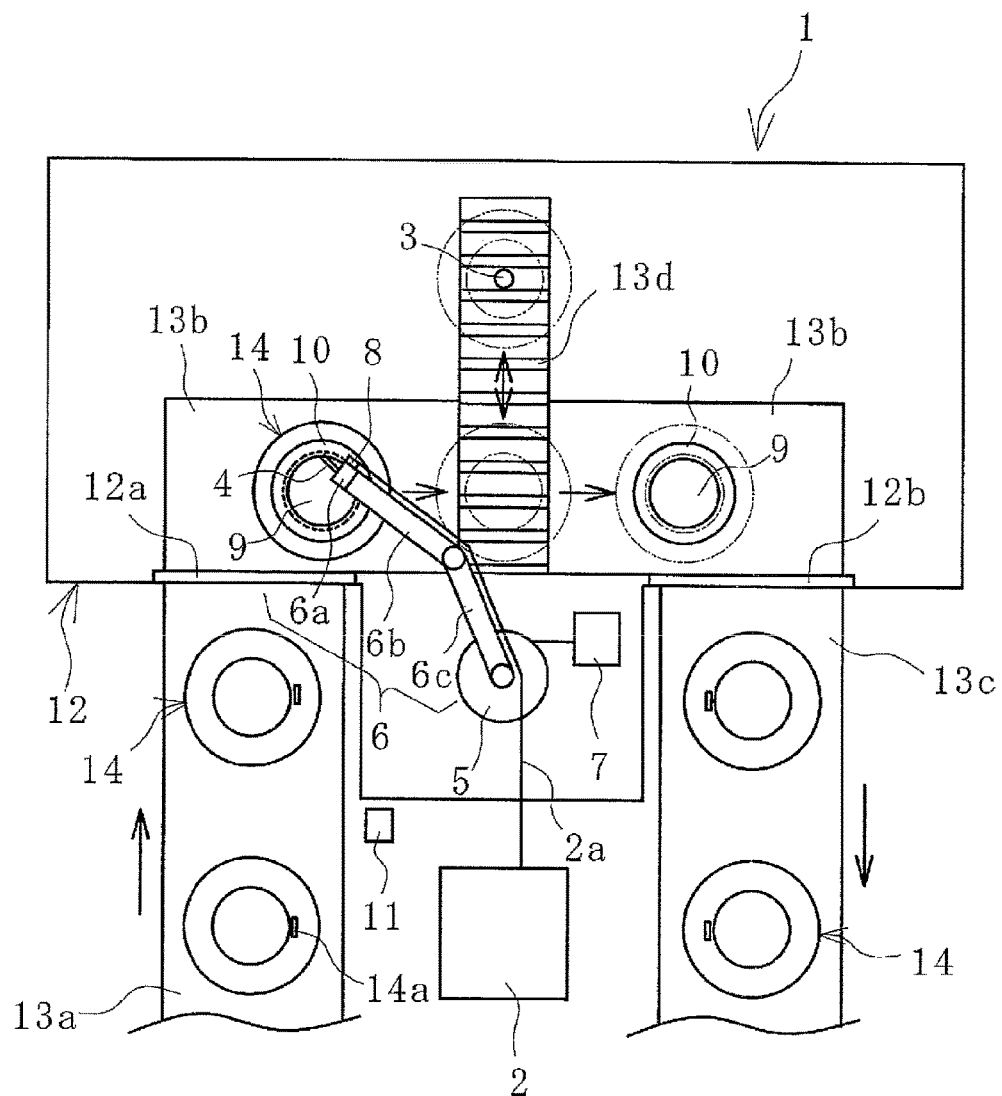
FIG. 1 is an explanatory diagram illustrating a tire cleaning system of the present technology in a plan view.

A tire cleaning system of the present technology will be described below based on embodiments illustrated in the drawings.

The tire cleaning system 1 of the present technology illustrated in FIG. 1 to FIG. 5 is provided with a laser oscillator 2, a laser head 4 irradiating a laser beam L, an arm 6 holding the laser head 4, and a control device 7 controlling movement of the arm 6. In this embodiment, a camera 3, a temperature sensor 8, a rotation mechanism 9 that rotates a tire 14, a bead holding mechanism 10 that holds a bead portion 16 of the tire 14, and a detector 11 that detects an identification tag 14a attached to the tire 14 as a cleaning target are further provided.

Various attachments are bonded by an adhesive after cleaning to an inner surface 15 of the tire 14 as a cleaning target. Examples of the attachment can include sponges or other sound absorbing materials, pressure sensors that detect a tire internal pressure, and the like.

The present technology removes contamination X adhered to the inner surface 15 of the tire 14 in order to bond or firmly bond the attachment to the inner surface 15 of the tire 14. For example, contamination X in a range continuing in a tire circumferential direction is removed for a predetermined distance in a tire width direction on the inner surface 15. An example of the contamination X as a removing target can include mold release agent and impurities that inhibit bonding of an attachment used in a manufacturing process of a tire.

The camera 3 is disposed in an inspection area described later, and acquires image data of the inner surface 15 of the tire 14. The temperature sensor 8 successively detects a temperature of the inner surface 15 where the laser beam L is irradiated. The temperature sensor 8 is attached to a tip end portion of the arm 6. The image data acquired by the camera 3 and temperature data detected by the temperature sensor 8 are input to the control device 7.

Figure 2:
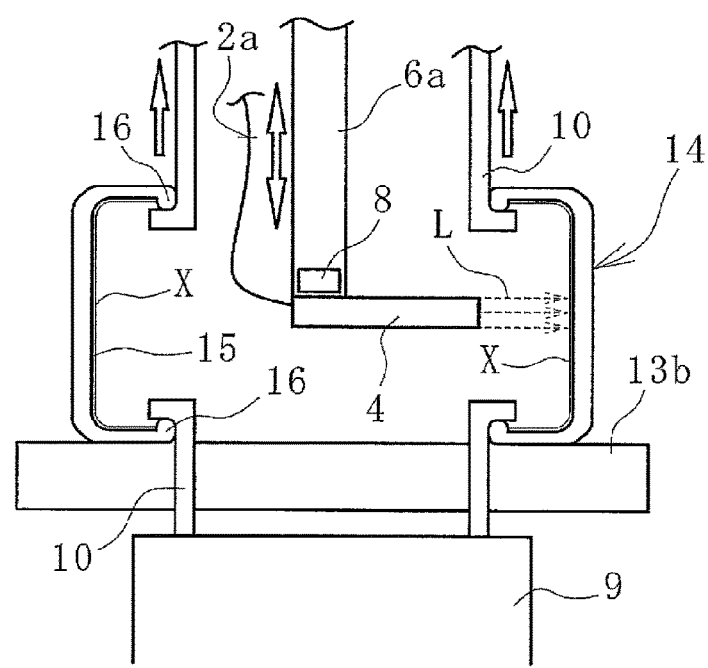
FIG. 2 is an explanatory diagram illustrating a step of cleaning a tire inner surface in a cross-sectional view.

The rotation mechanism 9 and bead holding mechanism 10 are disposed in a cleaning area described later. The bead holding mechanism 10 holds bead portions 16 of the tire 14 as illustrated in FIG. 2. Furthermore, the held bead portions 16 are both moved and held in a direction that expands an interval in the tire width direction. The rotation mechanism 9 rotates the tire 14 held by the bead holding mechanism 10 around a tire center axis while maintaining the tire in position.

Prior to cleaning the tire 14, the detector 11 detects information of the identification tag 14a attached to the tire 14. Information of the tire 14 specification (tire width, rim diameter, outer diameter, cleanings range, and the like) are stored on the identification tag 14a. The specification information of the tire 14 detected by the detector 11 is input to the control device 7.

Main components of the cleaning system 1 excluding the laser oscillator 2 and detector 11 are internally disposed in a cleaning booth 12 which is a closed space. The cleaning booth 12 is provided with an inlet door 12a and an outlet door 12b and is a structure that is a closed space can shield the laser beam L when the inlet door 12a and the outlet door 12b are closed.

A carrying-in conveyor device 13a is connected to the inlet door 12a, and a carrying-out conveyor device 13c is connected to the outlet door 12b. A space between the carrying-in conveyor device 13a and carrying-out conveyor device 13c is an internal space of the cleaning booth 12, and a cleaning conveyor device 13c is disposed at this position. The tire 14 to be cleaned is placed on the carrying-in conveyor device 13a, and the cleaned tire 14 is placed on the carrying-out conveyor device 13c. The cleaning conveyor device 13b is a cleaning area when cleaning the tire 14.

Figure 4:
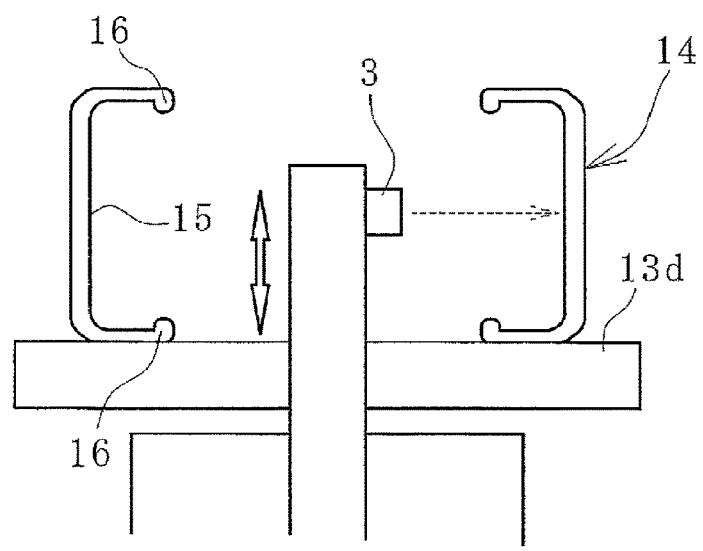
FIG. 4 is an explanatory diagram illustrating a step of determining a cleanliness state of the tire inner surface in a cross-sectional view.
Figure 5:
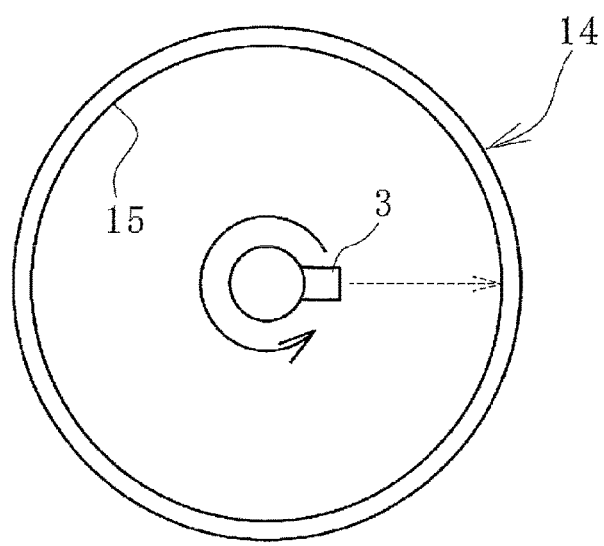
FIG. 5 is an explanatory diagram illustrating a tire inner portion in FIG. 4 in a plan view.

An inspection conveyor device 13d is disposed adjacent to the cleaning conveyor device 13b. In this embodiment, the inspection conveyor device 13d is disposed in order to divide the cleaning conveyor device 13b. As illustrated in FIG. 4, the camera 3 is retractably provided with regard to an upper surface of the inspection conveyor device 13d. The camera 3 projecting on an upper surface of the inspection conveyor device 13d can rotate 360° as illustrated in FIG. 5.

The laser oscillator 2 and laser head 4 are connected by an optical fiber cable 2a. The laser beam L supplied by the laser oscillator 2 is transmitted to the laser head 4 through the optical fiber cable 2a. A YAG laser beam is preferable as the laser beam L used in the present technology.

The laser beam L is irradiated on the inner surface 15 of the tire 14 by the laser head 4. The arm 6 is rotatably attached to an arm base 5 and is configured by rotatably connecting a plurality of arm portions 6a, 6b, 6c. The laser head 4 is removably attached to the tip end portion of the arm 6. Therefore, the laser head 4 can freely move three-dimensionally by controlling movement of the arm 6, and thus an irradiating direction of the laser beam L can be an arbitrary direction.

In this embodiment, only one laser head 4 is provided. The laser head 4a has a configuration where a galvano mirror is internally provided and the laser beam L can be widely irradiated by scanning in a width direction. The laser irradiation width is variable within a range of approximately 4 mm to 70 mm, for example. For example, the oscillating frequency of the laser oscillator 2 is from 10 to 40 kHz. The frequency at which the laser beam L is scanned in the width direction from the laser head 4a is from 20 to 150 Hz, for example. The laser irradiation width of the laser head 4 can be invariable (set at a predetermined width).

Next, a procedure for cleaning the inner surface 15 of the tire 14 using the cleaning system 1 will be described.

First, the tire 14 to be cleaned is horizontally placed on the carrying-in conveyor device 13a. Next, the inlet door 12a is opened, and the carrying-in conveyor device 13a and the cleaning conveyor device 13b are operated to move the tire 14 to be cleaned onto the cleaning conveyor device 13b.

Herein, as illustrated in FIG. 2, the bead portions 16 of the tire 14 are held by the bead holding mechanism 10 to position the tire 14 at a predetermined position. The inlet door 12a is closed to make the cleaning booth 12 a closed space. An interlocking structure is provided, in which the laser oscillator 2 is not actuated until the cleaning booth 12 is a closed space.

As necessary, the tire 14 is held in a condition where an interval in the tire width direction between the bead portions 16 is expanded by the bead holding mechanism 10. For example, the tire 14 with a smaller tire width than a predetermined dimension is in a condition where the interval in the tire width direction between the bead portions 16 is expanded when cleaning.

Next, the laser head 4 is relatively moved along the inner surface 15 of the tire 14, based on the tire 14 specification information input to the control device 7. In this embodiment, when the tire 14 is placed on the carrying-in conveyor device 13a, information on the identification tag 14a is detected by the detector 11, and the specification information of the tire 14 is input to the control device 7. The specification information of the tire 14 can be input to the control device 7 in advance by a separated method.

Figure 3:
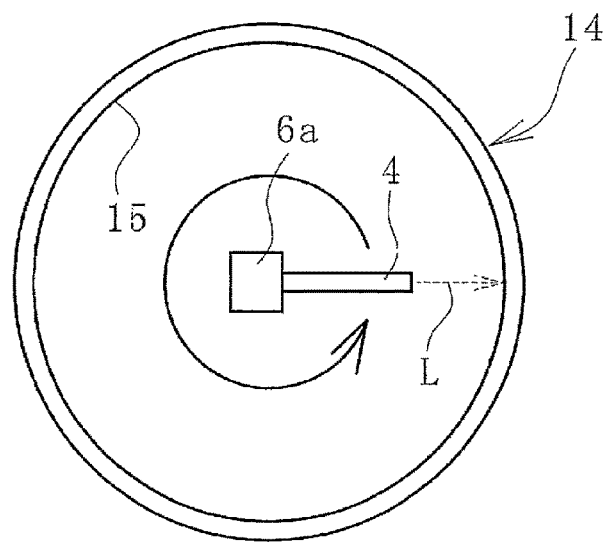
FIG. 3 is an explanatory diagram illustrating a tire inner portion in FIG. 2 in a plan view.

In this embodiment, movement of the arm 6 is controlled without rotating while maintaining the tire 14 at a predetermined position in a horizontal condition, and the laser head 4 is moved along the inner surface 15 as illustrated in FIG. 2 and FIG. 3. While the laser head 4 is moved in this manner, the laser beam L supplied from the laser oscillator 2 is irradiated on the inner surface 15. The contamination X adhered to the inner surface 15 is removed and cleaned by the irradiated laser beam L.

In order to suppress uneven irradiation of the laser beam L, a movement direction of the laser head 4 and irradiating direction of the laser beam L are controlled while maintaining an interval between a tip end of the laser head 4 and the opposing inner surface 15 to be as constant as possible. A movement velocity of the laser head 4 is as constant as possible, and the laser head 4 is moved so as to cover a cleaning target range.

The laser beam L can be irradiated on the inner surface 15 while maintaining and rotating the tire 14 at a predetermined position by the rotation mechanism 9. In other words, the laser head 4 is in a non-movable and secured condition, and the tire 14 is rotated by the rotation mechanism 9, and thus the relative position of both can be changed. Alternatively, the laser head 4 is moved, and the tire 14 is rotated, and thus the relative position of both can be changed.

The tire 14 cleaned by removing the contamination X is conveyed from the cleaning area to an inspection area where the camera 3 is disposed by the inspection conveyor device 13d. When the tire 14 is conveyed to the inspection area, the camera 3 standing-by at a position lower than an upper surface of the inspection conveyor device 13d protrudes higher than the upper surface, as illustrated in FIG. 4.

Next, the camera 3 acquires image data of the inner surface 15 of the tire 14 while rotating 360° as illustrated in FIG. 5. Note that image data of the inner surface 15 of the tire 14 can be acquired by securing the camera 3 to not rotate, and rotating the tire 14 360° around the tire axis.

The cleanliness state of the inner surface 15 is determined based on the acquired image data. The determined cleanliness state and the position information of the inner surface 15 is input to the control device 7. With regard to a position of the inner surface 15 where the determined cleanliness state does not satisfy a preset standard, the laser head 4 is moved to the position, and then the laser beam L is again irradiated and cleaning is performed, as described later in the inspecting step.

A standard for determining whether the cleanliness state is appropriate (contamination X is removed) or inappropriate (contamination X remains) is input and set to the control device 7 in advance. Therefore, whether the determined cleanliness state satisfies the preset standard is determined by the control device 7.

The standard for determining the cleanliness state is set based on a color intensity of the image data for the inner surface 15 acquired by the camera 3 for example. In a case where the density is higher than a certain degree, a cleanliness state indicating that the contamination X is remaining is set. Alternatively, the image data for the inner surface 15 can be acquired immediately before and immediately after the laser beam L is irradiated, the image data can be compared, and the standard can be set based on change in the color density. In a case where the color density has not changed or the degree of the change is small, the cleanliness state indicating that the contamination X is remaining is set. With this configuration, only a particularly contaminated position (range) is re-cleaned later, which is advantageous for efficiently and cleanly removing the contamination X.

While removing the contamination X by the irradiated laser beam L, reaction light is generated due to the laser beam L and contamination X reacting, and when the contamination X is removed and disappears, reaction light is not generated. Therefore, in order to determine the cleanliness state of the inner surface 15, the reaction light can be utilized in addition to the aforementioned method.

For example, a camera for detecting reaction light that captures reaction light generated due to the laser beam L and contamination X reacting is installed on the arm 6 and laser head 4. Furthermore, in a step of cleaning by irradiating the laser beam L on the inner surface 15, the image data of the inner surface 15 in a range where the laser beam L is irradiated is successively acquired by the camera for detecting reaction light. The image data acquired by the camera for detecting reaction light is input to the control device 7. For example, data for illuminance levels on the inner surface 15 when the reaction light is generated and not generated (data of a standard value which is a boundary for both cases) is input and stored in advance to the control device 7. In the control device 7, the illuminance level of the image data acquired by the camera for detecting reaction light is calculated, and the calculated results and standard value data of the pre-input illuminance. In a case where the illuminance level of the acquired image data is higher than the illuminance level of the standard value data, the contamination X is deemed to be remaining in the range where the laser beam L is irradiated. On the other hand, in a case where the illuminance level of the acquired image data is less than the illuminance level of the standard value data, the contamination X is deemed to not be remaining in the range where the laser beam L is irradiated. Thereby, the cleanliness state can be determined based on the presence or absence of reaction light in a range of the inner surface 15 irradiated with the laser beam L.

The tire 14 where inspection in the inspection area is completed is conveyed from the inspection area to the cleaning conveyor device 13b by the inspection conveyor device 13d. Herein, for a tire 14 where the cleanliness state determined in the inspecting step is deemed to satisfy the preset standards, the outlet door 12b is opened and the cleaning conveyor belt device 13b and carrying-out conveyor belt device 13c is operated to move the tire 14 that has been cleaned from the inside of the cleaning booth 12 to the outside. At this time, the inlet door 12a is opened and the carrying-in conveyor belt device 13a is operated to sequentially move the tire 14 to be cleaned from the outside to the inside of the cleaning booth 12 and position the tire at a predetermined position on the cleaning conveyor 13b. Thereby, the inner surface 15 of the tire 14 is continuously cleaned.

A tire 14 where the cleanliness state determined in the inspecting step is deemed not to satisfy the preset standards temporarily remains on the cleaning conveyor device 13b, the cleaning conveyor device 13b serving as the cleaning area, while moving from the inspection area (inspection conveyor device 13d) to the carrying-out conveyor device 13c. Furthermore, the laser beam L is again irradiated from the laser head 4 to perform cleaning with regard to the inner surface 15 of the tire 14, on the cleaning conveyor device 13b.

While cleaning is again performed on the inner surface 15 of the tire 14, a separate tire 14 conveyed immediately after the tire 14 is conveyed to the inspection area and inspected after cleaning in the cleaning area is completed for example. With this configuration, during recleaning of one tire, an inspecting process of one more separate tire 14 can be performed, and therefore, dead time of the process can be eliminated.

As described above, with the present technology, the laser beam L is irradiated to remove the contamination X adhered to the inner surface 15 while relatively moving the laser head 4 along the inner surface 15 of the tire 14 by the control device 7, and therefore, the contamination X can be efficiently removed without manual work, even with tires 14 of various specifications. In any case, the laser beam L is used for removing the contamination X, and therefore, a secondary process such as drying water or the like of known cleaning method using water is not required.

Therefore, a sound absorbing material or other attachment can be bonded to the inner surface 15 even immediately after cleaning where the contamination X is removed. Therefore, the present technology is advantageous for improving the productivity of the tire 14 with an attachment bonded to an inner surface. Furthermore, a device that discharges water from the inner surface 15 of the tire 14 to the outside as with a known method is not required.

In this embodiment, the laser irradiation width is set to a preset appropriate width based on specification information of the tire 14 of a cleaning target input to the control device 7. For example, in a case where the cleaning range of the inner surface 15 is relatively narrow, the width is set to a smaller laser irradiation width, and if the cleaning range is relatively wide, the width is set to a large laser irradiation width.

Therefore, the contamination X adhered to the inner surface 15 can be efficiently removed by switching to an appropriate laser irradiation width based on the size of the cleaning range or the like, even with one laser head 4. Furthermore, the system can correspond to a tire 14 with various specifications, and therefore, versatility is enhanced.

Furthermore, in this embodiment, the temperature of the inner surface 15 where the laser beam L is irradiated is successively detected by the temperature sensor 8. A permissible temperature is input to the control device 7 in advance. The permissible temperature is set to a predetermined temperature that does not reach a melting temperature of the inner surface 15 of the tire 14. Irradiation of the laser beam L is interrupted when the temperature detected by the temperature sensor 8 exceeds the preset permissible temperature. For example, with this configuration, the inner surface 15 is avoided from being overheated by the irradiated laser beam L, even in cases where problems such as a reduced movement velocity or stopping of the laser head 4 due to unintentional factors, and the like occurs. In other words, problems where the inner surface 15 thermally deforms or is scratched by the laser beam L can be prevented.

A plurality of the laser heads 4 can be provided. In this case, the laser irradiation widths of each of the laser heads 4 can be invariable (fixed at a predetermined width), the laser irradiation width of all of the laser heads 4 can be variable, or the laser irradiation width of each of the laser heads 4 can be variable.

Furthermore, the head sizes (volume) of the laser heads 4 can be different or the same. Furthermore, the laser irradiation widths of the laser heads 4 can be different or the same.

The cleaning system 1 can have a plurality of arms 6 or have one arm 6. With a configuration have one arm 6, in a case where a plurality of laser heads 4 are provided, cleaning is performed on a tire T to be cleaned by selecting one optimal laser head 4. With a configuration having a plurality of arms 6 that operate individually, one tire 14 can be cleaned simultaneously using the plurality of the laser heads 4.

The invention claimed is:

1. A tire cleaning system, comprising:
   a laser oscillator;
   a laser head that irradiates a laser beam provided from the laser oscillator onto a tire inner surface;
   an arm that holds the laser head;
   a control device that controls movement of at least the tire or laser head, and changes the relative position of the tire and laser head; and
   a temperature sensor that successively detects a temperature of the tire inner surface where the laser beam is irradiate; wherein
   the laser beam is irradiated and the tire inner surface is cleaned while relatively moving the laser head along the tire inner surface and
   the control device is configured to interrupt irradiation of the laser beam when a temperature detected by the temperature sensor exceeds a preset permissible temperature.

2. The tire cleaning system according to claim 1, wherein the arm is an arm that freely moves the laser head three-dimensionally, and
   the laser beam is irradiated while the arm moves the laser head.

3. The tire cleaning system according to claim 1, further comprising:
   a rotation mechanism that rotates the tire while maintaining at a predetermined position; wherein
   the laser beam is irradiated while the rotation mechanism rotates the tire.

4. The tire cleaning system according to claim 1, further comprising:
   a bead holding mechanism that holds bead portions of the tire; wherein
   the laser beam is irradiated in a condition where an interval in a tire width direction between the bead portions is expanded by the bead holding mechanism.

5. The tire cleaning system according to claim 1, wherein tire specification information is input to the control device and the laser head is relatively moved along the tire inner surface based on the specification information.

6. The tire cleaning system according to claim 5, further comprising:
   a detector that detects information of an identification tag attached to the tire; wherein
   the tire specification information stored on the identification tag is detected and input to the control device by the detector.

7. The tire cleaning system according to claim 1, further comprising:
   a camera that acquires image data of the tire inner surface; wherein
   a cleanliness state of the inner surface is determined based on image data of the tire inner surface after cleaning, acquired by the camera,
   the determined cleanliness state and position information of the inner surface are stored in the control device, and
   the laser beam is again irradiated and cleaning is performed with regard to a position of the inner surface where the determined cleanliness state does not satisfy preset standards.

8. The tire cleaning system according to claim 7, further comprising:
   a carrying-in conveyor device where the tires before cleaning are sequentially conveyed; and
   a carrying-out conveyor device where the cleaned tires after cleaning are sequentially conveyed; wherein
   the laser beam is irradiated and cleaning is performed in a cleaning area positioned between the carrying-in conveyor device and carrying-out conveyor device,
   gasping of the cleanliness state is performed in an inspection area adjacent to the cleaning area,
   the tire where the cleanliness state is determined is moved to the carrying-out conveyor device through the cleaning area,
   tires where the determined cleanliness state is deemed to not satisfy the preset standards remain in the cleaning area while moving from the inspection area to the carrying-out conveyor device, and
   the laser beam is again irradiated from the laser head and cleaning is performed on the tire inner surface.

9. The tire cleaning system according to claim 2, further comprising:
   a rotation mechanism that rotates the tire while maintaining at a predetermined position; wherein
   the laser beam is irradiated while the rotation mechanism rotates the tire.

10. The tire cleaning system according to claim 9, further comprising:
    a bead holding mechanism that holds bead portions of the tire; wherein
    the laser beam is irradiated in a condition where an interval in a tire width direction between the bead portions is expanded by the bead holding mechanism.

11. The tire cleaning system according to claim 10, wherein tire specification information is input to the control device and the laser head is relatively moved along the tire inner surface based on the specification information.

12. The tire cleaning system according to claim 11, further comprising:
    a detector that detects information of an identification tag attached to the tire; wherein
    the tire specification information stored on the identification tag is detected and input to the control device by the detector.

13. The tire cleaning system according to claim 12, further comprising:

a camera that acquires image data of the tire inner surface;
wherein
a cleanliness state of the inner surface is determined based on image data of the tire inner surface after cleaning, acquired by the camera,
the determined cleanliness state and position information of the inner surface are stored in the control device, and
the laser beam is again irradiated and cleaning is performed with regard to a position of the inner surface where the determined cleanliness state does not satisfy preset standards.

14. The tire cleaning system according to claim 13, further comprising:
a carrying-in conveyor device where the tires before cleaning are sequentially conveyed; and
a carrying-out conveyor device where the cleaned tires after cleaning are sequentially conveyed; wherein
the laser beam is irradiated and cleaning is performed in a cleaning area positioned between the carrying-in conveyor device and carrying-out conveyor device,
gasping of the cleanliness state is performed in an inspection area adjacent to the cleaning area,
the tire where the cleanliness state is determined is moved to the carrying-out conveyor device through the cleaning area,
tires where the determined cleanliness state is deemed to not satisfy the preset standards remain in the cleaning area while moving from the inspection area to the carrying-out conveyor device, and
the laser beam is again irradiated from the laser head and cleaning is performed on the tire inner surface.

* * * * *